Figure 1:
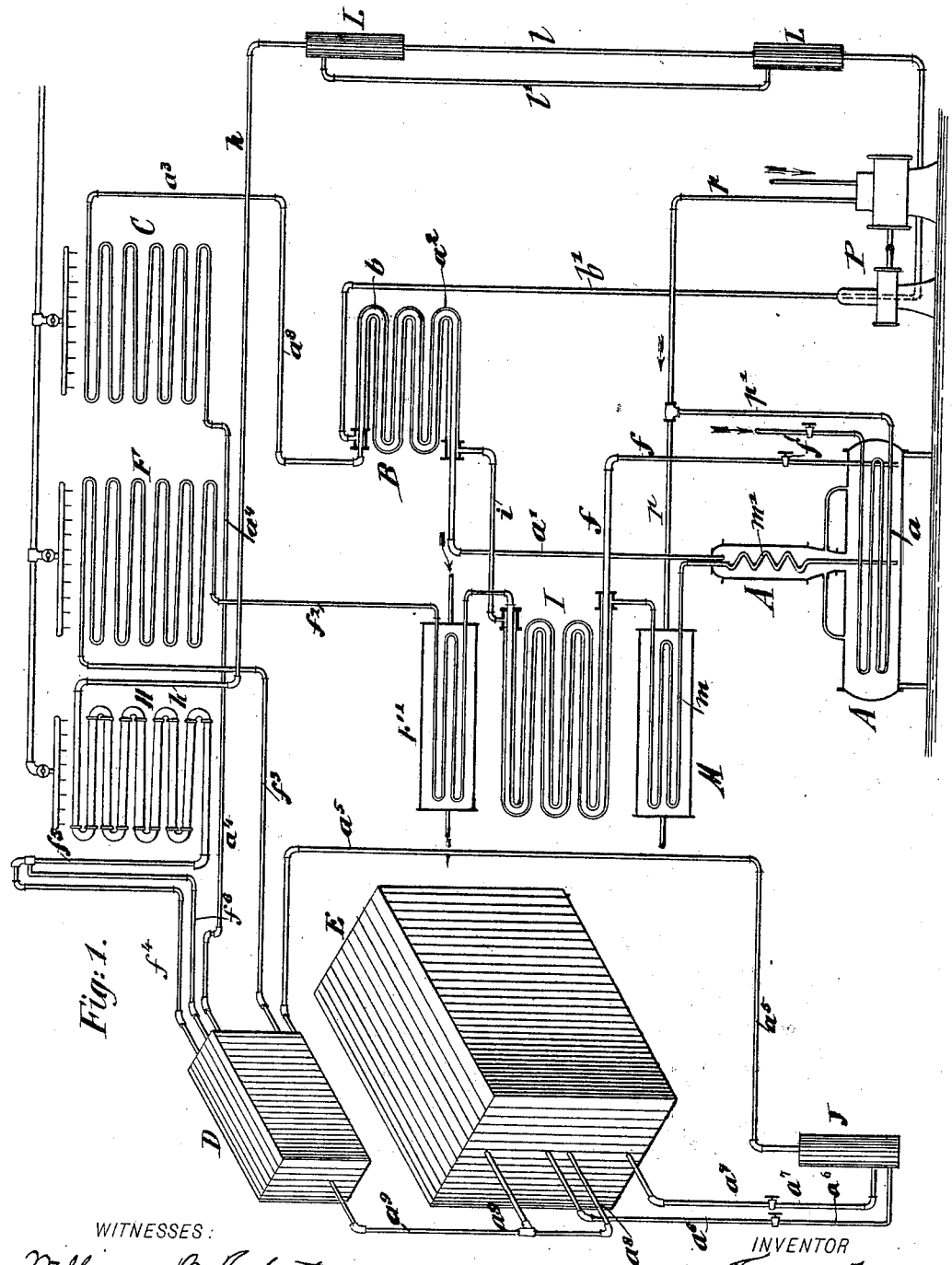

(No Model.)

3 Sheets—Sheet 1.

F. ALLEN.
ABSORPTION REFRIGERATING MACHINE.

No. 606,326.   Patented June 28, 1898.

WITNESSES:

INVENTOR
Frank Allen
BY
ATTORNEYS.

(No Model.)  3 Sheets—Sheet 2.
F. ALLEN.
ABSORPTION REFRIGERATING MACHINE.
No. 606,326.  Patented June 28, 1898.
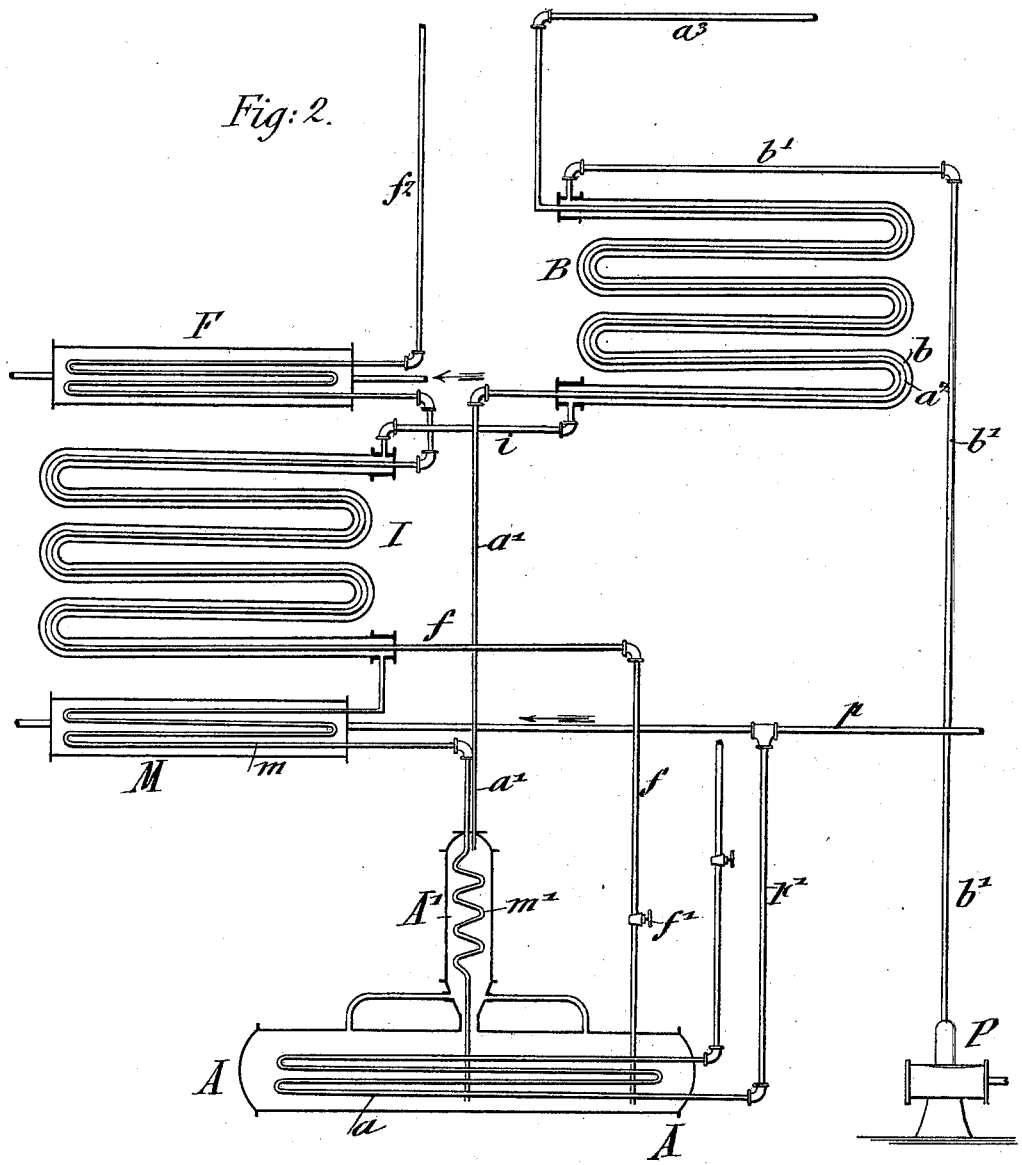

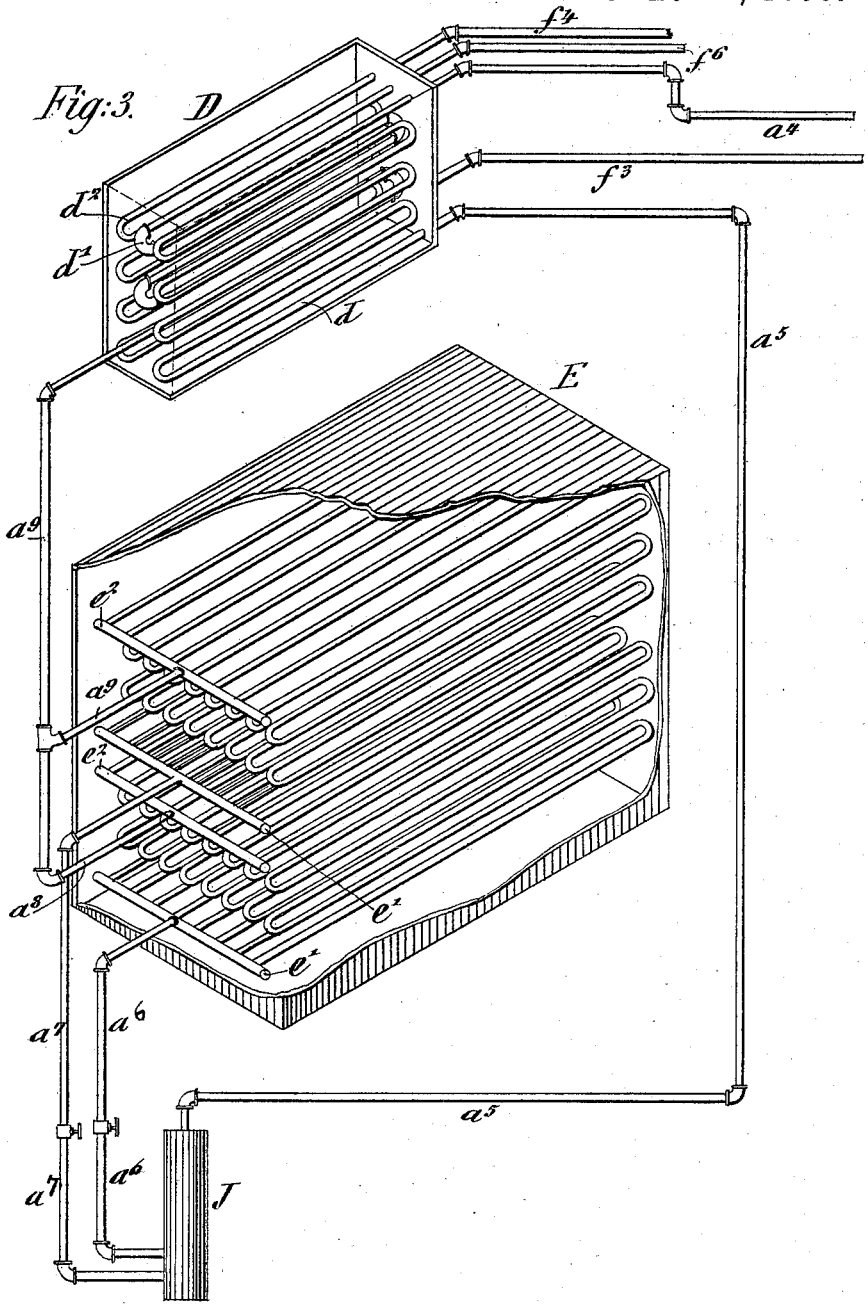

UNITED STATES PATENT OFFICE.

FRANK ALLEN, OF BROOKLYN, NEW YORK.

ABSORPTION REFRIGERATING-MACHINE.

SPECIFICATION forming part of Letters Patent No. 606,326, dated June 28, 1898.

Application filed April 12, 1897. Serial No. 631,867. (No model.)

*To all whom it may concern:*

Be it known that I, FRANK ALLEN, a citizen of the United States, residing at Brooklyn, in the county of Kings and State of New York, have invented certain new and useful Improvements in Absorption Refrigerating-Machines, of which the following is a specification.

The invention has reference to certain improvements in refrigerating-machines of that class which are known as "absorption" refrigerating-machines of such type as invented by Carré, and in which ammonia or other liquefiable gas is separated by heat from its aqueous solution, condensed by pressure and cooled into liquid condition, and then evaporated, so that the expansion of the liquid in gas form abstracts heat and produces a lower temperature in the space to be cooled.

The object of my improvements is to produce the refrigerating operation by a considerable economy in the fuel which is required to liberate the gas from the liquid in which it is contained and to condense the gas in an economical and effective manner by gradually abstracting the heat from the same and employing said heat for heating up the cold and saturated liquid when it is returned to the generator.

In the accompanying drawings, Figure 1 represents a perspective view in elevation of the entire apparatus, showing all the parts of the same. Fig. 2 is an elevation of the portion adjacent to the generator, in which the heat is abstracted from the hot gases liberated from the water in the generator, so as to prepare for the condensation of the same; and Fig. 3 is a perspective view of the system of expanding-pipes, parts being broken away to show the interior arrangement of the system of the cooling-pipes.

Similar letters of reference indicate corresponding parts.

A represents the generator or still, which is charged with commercial aqua-ammonia. The generator is heated up by a coil $a$, through which live steam is circulated, the heat of the same liberating the ammonia-vapors from the liquid, the vapors escaping through an upright section A', which is connected by a pipe $a'$ with a primary heating and cooling coil B, in which the interior coil $a^2$ forms a continuation of the pipe $a'$, while the exterior pipe $b$ serves for the passage of the strong aqua-ammonia that is returned from the absorber by a suitable pump. The strong aqua-ammonia has a low temperature and is conducted in a counter-current to the hot ammonia-gases through the primary heating and cooling coil B, the end of the outer coil $b$ being connected to the supply-pipe $b'$, that connects with the pump P. The cooled ammonia-vapors are then conducted through a small pipe $a^3$ to a condenser C, which is cooled by cold water that is supplied by a spray-pipe above the coil of the condenser, as shown in Fig. 1. From the condensing-coil C the cold vapors are conducted by a pipe $a^4$ to an upright coil $d$, that is arranged in a preliminary cooler D, in which the ammonia-vapors are cooled by the gases expanded in the central coil $d'$, by which the temperature in the cooling-tank D is lowered, so that the ammonia-vapors are liquefied and are conducted by a pipe $a^5$ to a jar J, in which the liquefied ammonia is collected. The ammonia-vapors are thus gradually cooled down to liquefaction first by the primary heater and cooler B, then by the action of the condenser C, and finally by the action of the cooling-tank D, so that in this manner an effective liquefying of the gas is obtained. From the jar containing the liquefied ammonia the same is permitted to expand, by means of two expanding-pipes $a^6$ and $a^7$, provided with stop-cocks, into a system of expanding-pipes $e\ e$, which are arranged in the brine-tank E and which are provided at their ends with horizontal manifolds $e'$, to which the expanding-pipes $a^6$ are connected. The manifolds $e^2$ at the outgoing ends of the two systems of pipes are again connected by pipes $a^8$ and $a^9$ with a coil $d'$ in the cooling-tank, said coil serving to absorb the cold contained in the expanding gases after the cooling action of the same has been utilized in the brine-tank. The cold still contained in the expanding ammonia-vapors serves to chill the gases passing through the coil $d$ on their way to the jar J and reduces also the temperature of the weak ammonia-water that passes through a third upright coil $d^2$, that is arranged in the cooling-tank D and which is supplied from a weak-water cooler F, that is located between the condenser C and absorber H. The weakammonia-water cooler F is also arranged in the form of a coil in the same manner as the condenser and supplied with cooling-water by a water-spray pipe arranged above the same. The weak ammonia-water is supplied from the generator by the pressure at the interior of the same, the weak ammonia-water rising in a pipe $f$, provided with a stop-cock $f'$ and passing through a secondary heating and cooling coil I, the weak-ammonia-water pipe being at the interior of said coil, while the outer coil carries the strong ammonia-water that is returned from the primary heating and cooling coil B, being connected by a pipe $i$, as shown in Figs. 1 and 2. The hot and weak ammonia-water gradually gives off its heat to the strong aqua-ammonia returned from the absorber by the pump, so as to heat the same preliminarily in its return into the generator. The weak ammonia-water is still further cooled on its way to the weak-water cooler F by being conducted through an auxiliary cooling-tank F', to which cold water is supplied by a suitable supply-pipe, which water is heated up by the weak ammonia-water and then conducted to the boiler, so that the auxiliary cooling-tank F' acts in the nature of a feed-water heater for the boiler. From the coil of the auxiliary cooling-tank F' the weak ammonia-water is conducted through a pipe $f^2$ to the lower end of the weak-ammonia-water cooler, then passed through the same, so as to be subjected to the further cooling action of the same, and then conducted by a pipe $f^3$, connected with the upper part of the weak-water-cooling coil to the coil $d^2$ in the cooling-tank D, and then returned by a pipe $f^4$ and pipe $f^5$ to the absorber H. The weak-ammonia-water-conducting pipe $f^4$ is connected at its point of juncture with the pipe $f^5$ by a pipe $f^6$, that conducts the cold ammonia-vapors back to the absorber. The absorber H is subjected to the cooling action of a spray of water arranged at the upper part of the same in the same manner as those of the condenser and weak-ammonia-water cooler, so that the weak ammonia-water absorbs the ammonia-vapors at a low temperature. The supply-pipe $f^5$ connects with the lower end of the absorber, the upper part of the same being connected by a pipe $h$ with the pump P, by which the circulation of the strong ammonia-water and its return to the generator is kept up. In the return-pipe $h$, by which the strong ammonia-water is conducted by the pump back to the generator, are interposed two cylindrical jars L, which are arranged vertically above each other and which are connected by a vertical pipe $l$ and, further, by a by-pass pipe $l'$, which connects the upper end of the upper jar with the upper end of the lower jar L. The purpose of the upper jar is that it acts as a break on the fall of the strong ammonia from the absorber to the lower jar, thus preventing too great a suction, which would cause the absorber to be emptied. The by-pass acts as a relief by enabling any gas that may accumulate in the lower jar to pass up through the by-pass into the upper jar, thus insuring a steady supply of strong ammonia from the absorber. It also acts as a condenser by causing the gas to be condensed as it passes from the by-pass into the upper jar by coming in contact with the cold ammonia as it passes from the absorber to the jars.

The exhaust-steam from the pump P is conducted through a pipe $p$ to an exhaust-steam heater M, to which also the exhaust-steam from the live-steam coil $a$ of the generator A is conducted by a pipe $p'$. The exhaust-steam and the return-steam from the coil $a$ fill the exhaust-steam heater M and heat thereby the strong aqua-ammonia, which is returned by the pump P through the two heating and cooling coils B and I, which is passed through a coil $m$, arranged in the exhaust-steam heater M, and then returned into the upright tank A' by means of a pipe $m'$, and then back into the generator.

It appears from the foregoing that the hot ammonia-vapors are subjected to a gradual cooling action on their way to the condenser and liquefying-jar—first in the combined heating and cooling coil B, then in the condenser C, and finally in the coil located in the cooling-tank D, the gradual reduction of temperature taking place in three successive steps. The weak ammonia-water is likewise cooled by being subjected to four successive cooling actions—first in the combined heating and cooling coil I, then in the auxiliary cooling-tank F', next in the cooling-coil F, and finally in the coil located in the cooling-tank D. In the same manner the weak ammonia-water, after it has absorbed the ammonia-vapors in the absorber, is gradually raised in temperature on its way back to the generator in three steps by being successively passed through the heating and cooling coils B and I and the exhaust-steam heater M, so that thereby on one side the heat of the liberated ammonia-vapors and of the weak ammonia-water is utilized in an effective manner in heating up the cold strong ammonia-water on its return to the generator, while, on the other hand, the cold still contained in the vapors expanded from the liquefied ammonia is utilized in the cooling-tank D for cooling purposes. Likewise the heat of the exhaust-steam from the pump and the return live steam in the generator is utilized in the exhaust-steam heater for the final heating of the strong ammonia-water, all these steps together tending to an economy of fuel and to the more effective working of my improved refrigerating plant, inasmuch as a very economical transference of the heat units from the hot vapors and weak ammonia-water to the cold vapors and strong ammonia-water is produced.

Having thus described my invention, I claim as new and desire to secure by Letters Patent—

1. The combination of a generator provided with steam-heating devices, a pump for returning the strong water of ammonia to the generator, an exhaust-steam heater connected with the exhaust-port of the pump-engine and with the steam-coil in the generator, and a coil in said exhaust-steam heater through which the strong ammonia-water is passed on its return to the generator so as to be heated up to the required high temperature, substantially as set forth.

2. The combination of a generator, suitable means for heating the same, an escape-pipe for the hot ammonia-vapors, a primary heater and cooler comprising an interior coil for the hot ammonia-vapors, and an exterior coil for the strong ammonia-water, a condenser connected with the interior coil of the said primary heater and cooler, a secondary heater and cooler, comprising an interior coil for the weak ammonia-water, and an exterior coil for the strong ammonia-water, an escape-pipe connecting the generator with the interior coil of the secondary heater and cooler, a pipe connecting the exterior coil of the primary and secondary heater and cooler, a cooler for the weak ammonia-water connected with the interior coil of the secondary heater and cooler, a cooling-tank, a coil in the same for the expanded ammonia-vapors, a second coil in said tank connected with the condenser, a third coil connected with the cooler for the weak ammonia-water, an absorber connected with the first and third coils of the cooling-tank, a pump, a pipe connecting the absorber with the pump, means connected with the last pipe for preventing too great suction on the absorber, a pipe connecting the pump with the exterior coil of the primary heater and cooler, a steam-heater, a coil in the latter connected at one end with the said exterior coil of the secondary heater and cooler, and a return-pipe connecting the coil in the steam-heater with the generator, substantially as set forth.

3. The combination, with an absorber, of a pump for returning the strong ammonia-water from the absorber back to the generator, a pipe connecting the absorber with said pump, two jars located vertically one above the other in said return-pipe, a direct pipe connecting said jars, and a by-pass pipe connecting the upper ends of one jar with the other, said jars and by-pass pipe preventing the undue suction of the pump on the absorber, substantially as set forth.

In testimony that I claim the foregoing as my invention I have signed my name in presence of two subscribing witnesses.

FRANK ALLEN.

Witnesses:
SAM L. FINLAY,
PATRICK J. SWEENEY.